United States Patent [19]
Wischnik et al.

[11] Patent Number: 5,805,729
[45] Date of Patent: Sep. 8, 1998

[54] PROCEDURE AND EQUIPMENT FOR PRODUCTION OF LINE DATA

[75] Inventors: Arthur Wischnik, München; Erik Speidel, Hanau; Ernst Nalepa, Rüsselsheim, all of Germany

[73] Assignee: EDS Electronic Data Systems Fertigungsindustrie, Russelsheim, Germany

[21] Appl. No.: 393,008

[22] PCT Filed: Aug. 26, 1993

[86] PCT No.: PCT/EP93/02301

§ 371 Date: Mar. 3, 1995

§ 102(e) Date: Mar. 3, 1995

[87] PCT Pub. No.: WO94/06089

PCT Pub. Date: Mar. 17, 1994

[30] Foreign Application Priority Data

Sep. 4, 1992 [DE] Germany .................. 4229 647.1

[51] Int. Cl.[6] .......................................... G06K 9/46
[52] U.S. Cl. ..................... 382/204; 382/199; 382/266
[58] Field of Search ............................. 382/128, 204, 382/125, 199, 266, 197, 276, 292

[56] References Cited

U.S. PATENT DOCUMENTS 4,908,872 3/1990 Toriu et al. ........................ 382/197

FOREIGN PATENT DOCUMENTS

0334230A2 3/1989 European Pat. Off. .

OTHER PUBLICATIONS

Comput. & Graphics, Vo. 9, No. 1, pp. 69–70, 1985, VDAFS—An Interface to Transfer Surface Description Data Between CAD Systems, P. Rehwald.

Solftware Kurier, 1991, pp. 98–105, Dreidimensionale Rekonstruktion auf der Basis segmentierender bildgebender Verfahren, A. Wischnik.

Computer Vision, Dana H. Ballard—Christopher M. Brown, pp. 119–143.

*Primary Examiner*—Dwayne Bost
*Assistant Examiner*—Brian L. Johnson
*Attorney, Agent, or Firm*—L. Joy Griebenow

[57] ABSTRACT

A process and apparatus for the production of line data from measurements correlated with specific characteristics of an object measured. The invention provides that the measurements thus obtained are coded by measurement points and stored in an orientated matrix, the individual elements of this matrix are examined repeatedly for prescribed correlations and the elements meeting in each case the prescribed correlation are in each case coordinated into groups of point coordinates defining a line plot, and the line plots thus produced are depicted.

22 Claims, 2 Drawing Sheets

PROCEDURE AND EQUIPMENT FOR PRODUCTION OF LINE DATA

BACKGROUND OF THE INVENTION

The present invention relates to a process and device or apparatus for the production of line data.

Processes or procedures of this type are used in particular in the design of motor vehicles, in order to convert the geometric contours of a motor vehicle body model into line data, which can then be further processed using computer-aided design (CAD) processes. For this purpose the scale model is scanned by a coordinates measurement machine used as a measurement recorder. From this data recorded at different measurement points of the geometry of the model a grid pattern is produced. From this grid pattern the line data are finally created. This known procedure has numerous disadvantages which considerably restrict its facility for use. In order to be able to reproduce the contours of the scanned model with satisfactory precision, it is essential that the person operating the coordinates measurement equipment has adequate experience. In fact, with reference to the quality of the line data to be created, the choice of the scanning points is extremely critical and must be specified for each model afresh depending upon the surface to be scanned. Consequently for each individual case complicated considerations are necessary regarding the position of the selected measurement points, which make high demands of the operating personnel. Thus a disadvantage of the known procedure is that it is extremely time consuming. From production of the model via scanning until the data become available in computer coded form as a rule about six months pass by, with the pure data recording and conversion taking about three months. But with the pressure of competition which obtains at present in the automobile industry, expressed in the catchphrase "fast to market", a preparation time of this length is not only uneconomic, but also no longer tolerable.

Moreover, with the known procedure there is the disadvantage that it is only practicable for relatively simple shaped outer surfaces. Mechanical scanning of the surface to be converted into line data requires that the measurement points selected must be accessible to a mechanical probe. But with complicated shaped surfaces with numerous narrow recesses—such as the heat exchanger of a radiator—this can only be done with great difficulty if at all.

From DE 38 18 534 and DE 39 21 093 there is known a process for depiction of the locally resolved distribution of physical dimensions on a display as well as equipment to carry out this process. With this process, in the first stage correlated measurements are recorded at measurement points using a measurement recorder with specific characteristics of a measurement subject. The analogue output signals created by the measurement recorder are converted into digital values. These digital values are then stored in the storage section of a measurement memory allocated to each measurement recorder. From the digital values stored in the measurement memory, an initial picture in matrix form, corresponding to the local arrangement of the measurements, with individual quadrates of lateral length s is created. A second picture in matrix form with individual quadrates of lateral length b=s/2n is created from Pixel figures forming a Pixel data field, with the measurement data field and the Pixel data field being regarded as superimposed upon each other. Thereafter, for each Pixel of the Pixel data field a Pixel value is calculated from the quadratic environment surrounding this Pixel in the Pixel data field centrally in such a manner that each digital value recorded from the environment surrounding the measurement data field and stored there is weighted with a portion of the area contained by multiplication in the form of a product, the sum of all the products is formed and this sum—if necessary is divided by the sum of all portions of the area of the surrounding environment as a quotient—is stored in the Pixel memory at the relevant position. With the known procedure the disadvantage is that through this creation of a mean figure via a defined quadratic environment area of the Pixel concerned clogging is created of the measurements represented by the corresponding digital values, which drastically reduces the resolution capacity of adjacent measurement points in an extremely disadvantageous manner. "Clogging" means confusion or blurring of the measurements represented by the corresponding digital values.

The quotient formed in this way is stored in the Pixel memory at the relevant position and each bit corresponding to a Pixel is read and a presettable bit is stored at a specified position for the bit in the corresponding position allocated to this Pixel in an initial bit memory. The content of the bit memory is displayed as areas of the same local dimension. Through a further logic linking, lines of the same local dimension can be obtained by readout of a second bit memory.

The known procedure has not only the disadvantage mentioned above that in its execution a drastic reduction in resolution accuracy occurs through the mean value creation via the measurements in a defined quadratic environment around the measurement point in the measurement field to be processed, undertaken during generation of the Pixel values to be allocated to the individual Pixels of the Pixel data field. Consequently, with the known procedure the disadvantage is that due to the low resolution it is not possible to resolve and reproduce fine structures of the measurement field. A further disadvantage of this known procedure is rather that it is not possible to investigate the measurements stored in the measurement field for the existence of predefined correlations: In the known procedure, the mean value creation and described above is always used for allocation of a measurement and Pixel value, so that the disadvantage is that it is not possible to summarise the measurements stored in the measurement field selectively into lines representing the prescribed correlation conditions. A further disadvantage of the known procedure is that through the procedural stages carried out to depict the lines of the same local density a loss of information occurs of such a nature that the allocation of position between a measurement point on the measurement data field representing a specific local position of the allocated measurement recorder and the Pixel of the Pixel data field to be represented on the monitor is no longer clearly present. Thus with the known processes or procedure the disadvantage is that it is no longer possible to reconstitute the original spatial position of the measurements depicted by the lines of same local dimension on the screen. This excludes any further processing of the measurement points represented by these lines at the outset.

In the magazine "Surface Rendering: Investigation of Medical 3D Rendering Algorithms", March 1990, pages 41 ff. various methods are described for visual representation of sectional data through the human body obtained through computer tomographs or by means of NMR procedures. The visualisation algorithms shown therein and the correlation conditions for analysis of measurement data described in the article again permit only a visual depiction of the measurement data on a screen, with loss in this case also of the spatial correlation between the original measurement and the Pixel represented on the screen in the course of carrying out the procedure.

From U.S. Pat. No. 4,958,378 a process and apparatus are known, for carrying out a real time comparison of picture elements of two windows of a user surface of a data processing unit. Provision is made that when changing from one window to the next only those picture elements are again written which alter in the course of transition from the first to the second window. In order to be able to carry out this updating of the monitor with particular speed, the procedure disclosed in this patent provides that the picture elements in the first window are written into a memory in such a way that each Pixel value representing a defined X/Y coordinate of the screen is stored on a predefined storage position in memory, that each Pixel of the second window to be created is compared with the Pixel of the first window allocated to the corresponding screen position by a comparator, and if there is a difference in Pixel values of a picture element in the first and the second grid the identification of this X/Y coordinate of the screen is displayed in order to indicate that this Pixel must be changed on updating the screen.

SUMMARY OF THE INVENTION

In order to get around the disadvantages mentioned previously, the present invention has as an object providing a process or procedure which allows for a quicker and simpler creation of line data. A further object is to provide apparatus appropriate to carry out the process in terms of the present invention.

By the present invention, the objects are attained by a process in which, in a first stage, correlated measurements are recorded at measurement points by means of a measurement recorder with specific characteristics of a measurement object, together with a device or apparatus to execute the process in which in a second stage a measurement coding of the measurements recorded in the first stage is carried out, these coded measurements are stored in-an orientated matrix, with allocation of a measurement point to an element of the orientated matrix depending upon the geometric point coordinates represented by this measurement point, and in a third stage from an element of this orientated matrix functioning as a starting point identification of coding differences between the coding allocated to the starting point and the coding of any comparison element of the orientated matrix lying within a defined environment around the starting point is carried out with a difference signal representing each of the coding differences being deduced, with analysis to find out whether the difference between these two elements of the orientated matrix corresponding to a predefined correlation, in which case an index signal is created, by which this comparison element is given an index, and the partial step sequence specified by the partial steps of the third stage listed above is repeated constantly. An element of the orientated matrix indexed in the previous partial step sequences is used as the starting point for each fresh partial step sequence, and in a fourth stage a search run is carried out over the indexed elements of the orientated matrix and the geometrical point coordinates of the measurement object represented by these elements are ascertained, then in a fifth stage the point coordinates thus ascertained are linked as lines and are depicted.

The particular advantage of the features of the present invention is that a process is produced that is not restricted effectively to simple and quick conversion of measurements recorded at measurement points into line data. The process of the present invention also enables these line data to be produced in an entirely automatic manner from any object of measurement whatsoever. With great advantage provision is made for the measurements recorded at measurement points by the recorder, correlated with specific characteristics of the object measured, to be converted into a corresponding measurement coding and to be stored in an orientated matrix. The measurement coding provided by the present invention facilitates simpler processing of the measurements recorded by the recorder in the stages of the process following this coding. The identification of coding leaps or coding intervals between the starting point in each case of the relevant partial step sequence and the comparison element in each case carried out constantly in the third process stage in a repeated series of partial step sequences, as well as the correlation test between these two elements of the orientated matrix, associated with the indexing of the correlated comparison points carried out afterwards, particularly facilitates automatic selection of those measurement points which are to be allocated to a specified line plot. Thus the process of the present invention facilitates the selection automatically, from uncorrelated measurement points present, of those which must be coordinated as line data. It is particularly advantageous that in addition, after the execution of the search run over the indexed elements of the orientated matrix, the geometric point coordinates of the object measured represented by these elements, which specify the depiction of the lines, are immediately available. This ensures very efficiently defined and clear allocation between the geometric position of the measurements recorded in the first stage and the measurements present in the last stage meeting the prescribed correlation condition, so that the positional data of the measurements thus selected can be immediately further processed in an advantageous manner.

A useful extension of the present invention provides that, prior to the search run over the indexed elements of the orientated matrix, at least one of them is subject to interpolation, in which this element is split up into a number of sub elements, to each of which the original coding is allocated. This has the advantage that in the search run which follows over the index elements of the orientated matrix a more refined grid of indexed elements is available, enabling greater precision to be achieved in the coordination of the indexed elements into line plots which follows the search run.

A further useful extension of the present invention provides that prior to the fifth stage, any indexed elements of the orientated matrix having deviation from the lines allocated to them of below a prescribed limit are eliminated. This measure facilitates the elimination of redundant elements. This usefully achieves a reduction in the elements of the orientated matrix not required to reproduce the line plots produced in accordance with the present invention.

A further useful extension of the present invention provides that after the fifth stage the polygon lines are processed into Spline curves, Spline functions being produced which approximate to the point coordinates ascertained under the present invention. This has the advantage of simpler depiction of the line plots produced by the present invention.

A further useful extension of the present invention provides for the use of a nuclear magnetic tomograph, computer tomograph or sonograph to be used as the measurements recorder. This feature has the advantage that it is not restricted solely to the useful recording by measurement points of the outer surfaces of the object measured. Using the forms of the measurement recorder mentioned above, it is also possible to record internal surfaces or structures, thus considerably expanding the field of application of the procedure under the present invention.

Yet another useful extension of the present invention provides for the measurement coding to be carried out in such a manner that a defined grey value is allocated to each measurement point. This has the advantage that in the measurement coding recourse can be had to known picture element creation systems.

BRIEF DESCRIPTION OF THE DRAWINGS

Further details of the present invention can be found in the description of the preferred embodiment which follows, described below using the drawings.

DETAILED DESCRIPTION OF A PREFERRED EMBODIMENT

Figure 1:
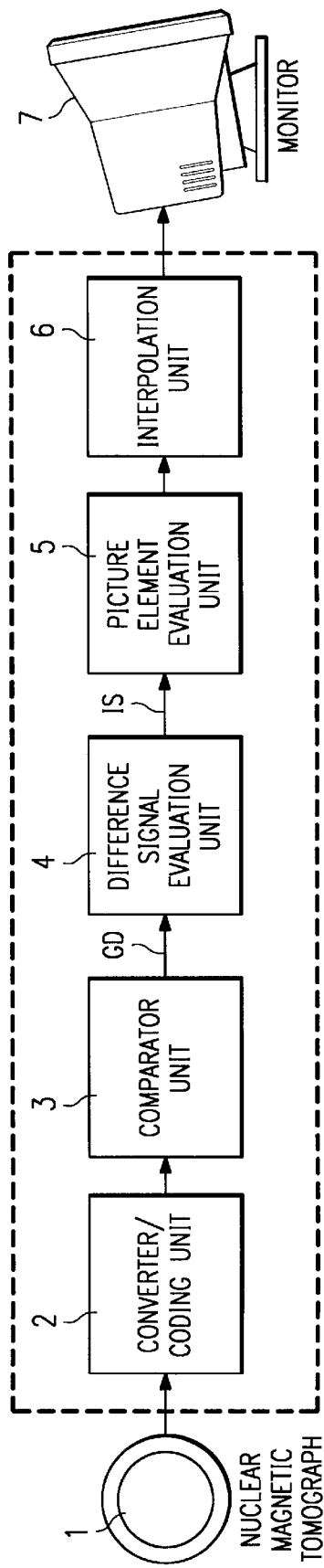
FIG. 1 shows a diagrammatic representation of an exemplary embodiment of equipment to carry out the process of the present invention.

In what follows, a embodiment of the process for conversion of measurements into line data is described using the equipment depicted in FIG. 1.

In a first stage of the process, the measurements, to be converted subsequently into line data, of an object measured and not depicted in FIG. 1 are obtained. For this provision is made for the measurements to be recorded by an already known nuclear magnetic tomograph 1. Recording of measurements by means of the nuclear magnetic tomograph 1 is a known procedure, so that further details are not needed. It should merely be mentioned that at the end of each segmenting measurement carried out by the nuclear magnetic tomograph 1 of a sectional plane of the object measured, we have available an equidistant grid of measurement points of this sectional plane related to the resolution facilities of the nuclear magnetic tomograph, with defined geometric, point coordinates being allocated to each measurement point of the measurement point matrix thus formed and with different measurements of the individual measurement points of the measurement point matrix corresponding to differing material density of the object measured.

The use of a nuclear magnetic tomograph and recording of the material density are not compulsory prerequisites for executing the process. Thus it is also possible to use a computer tomograph or device operating in accordance with an ultrasound procedure, a sonograph, for recording the measurements and to record with them the specific characteristics of the object measured which can be captured by such instruments. However, these three procedures mentioned have the advantage that it is possible to carry out contact-free, non-invasive and consequently non-destructive recording both of the outer contours and in a particularly advantageous manner identification of the inner structures of the object measured. In addition, the use of a measurement recorder working without contact has the advantage that it is possible to record surfaces or structures separating layers or separating surfaces not only of solid but also of liquid or gaseous objects of measurement.

It is also possible to use known mechanical or optical scanning procedures. The only important feature with regard to the measurement recorder used is that each measurement point recorded is correlated with a defined geometric space position and the measurement obtained at this measurement point is characteristic for a specified characteristic of the object measured such as, for example, material density.

Then the following steps are carried out for each individual cross sectional plane:

In a second stage the measurements created by the nuclear magnetic tomograph 1 and possibly stored temporarily in appropriate form are digitalised in a converter-/coding unit 2 and changed into picture elements in a known manner, with a corresponding grey value being allocated to each measurement point, the level of grey corresponding to the measurement of the measurement point. The individual picture elements composed in this way are then stored in the form of an orientated picture element matrix, with allocation of a coded measurement to an element of the orientated picture element matrix depending upon the geometrical point coordinates represented by this picture element.

In place of the coding of measurements described above, by allocating a defined grey value correlated with each measurement it is also possible to undertake a different form of measurement coding. The only important factor is that a defined coding should be allocated to each measurement of the individual measurement points of the measurement point matrix, this coding being characteristic for the individual measurement of the measurement point.

Preferably, any coding of measurements chosen should also facilitate simple execution of the steps mentioned hereafter.

In a third stage, identification is carried out of grey value leaps or grey value intervals of adjacent picture elements in the orientated picture element matrix. For this purpose a comparator unit 3 of the apparatus is used. In an initial partial step of the third stage a picture element of the picture element matrix is defined as the starting point. The choice of this starting point can be made in such a way that identification of grey value leaps or grey value intervals is carried out independently of the object measured, always from a defined starting point—e.g. from the top left picture element of the picture element matrix. But it is also possible to start from some other defined picture element of the picture element matrix, whether or not related to the object measured. It is further possible to conceive that the picture element of the picture element matrix functioning as the starting point is chosen from case to case at random.

Working from a starting point specified in this way, in a second partial step of the third stage the grey values of the picture elements of the picture element matrix adjacent to the starting point are compared by the comparator unit 3 with the grey value of the starting point. By the term "adjacent picture elements" is meant those picture elements which lie within a defined environment around the starting point. Thus it is possible for this purpose to involve only those four picture elements closest to the starting point in the orientated picture element matrix (to the right, to the left, above and below the starting point). Further it is conceivable to involve in place of these four picture elements or as supplements thereto the four picture elements next closest to the starting point in the picture element matrix to identify the grey value differences occurring between such picture elements, etc.

Now on each occasion the comparator unit 3 compares the grey value of the starting point with the grey value of an adjacent picture element of the picture element matrix and for each comparison creates a grey value difference signal GD, which is characteristic for the grey value difference in these two picture elements.

This grey value difference signal GD is taken to a difference signal evaluation unit 4. This analyses the grey value difference signal GD created by the comparator unit 3 to find whether the difference between the grey value of the starting point and the grey value of the comparison picture element meets a prescribed correlation. This correlation, dependent upon the purpose for which the process is being used and prescribed as purpose orientated, can be in particular that there is a requirement for the two grey values to come within prescribed tolerances. Specification of the correlation in this way is particularly advantageous if it is intended to create line data which corresponds to associated structures:

The nuclear magnetic tomograph 1 functioning as the measurement recorder allocates to material areas of the same density the same grey values, so that all measurement points lying within a specified material area have the same grey value. Consequently using the correlation condition "same grey value" it is possible to identify different elements of the object measured to which a defined line plot is then to be allocated.

If the specified correlation is met, the difference signal evaluation unit 4 creates an index control signal IS, which produces indexation of the comparison picture element concerned in the orientated picture element matrix.

In a fourth partial step of the third stage the signal processing operations of the third partial step are repeated, but with the starting point being a picture element of the picture element matrix which has been indexed in the third partial step by the difference signal evaluation unit 4 using the index control signal IS created by it. In further subsequent partial steps of the third stage the partial step sequence of partial steps 3 and 4 of the third stage as described is repeated constantly until either there is no picture element of the picture element matrix meeting the required correlation condition in the predefined environment around any starting point of the relevant partial step or until the very first starting point of the iterative procedure, i.e. the starting point employed in the first partial step sequence of the third stage, is again reached. The circumstance first mentioned means that the starting point of this partial step of the third stage represents the end point of the line to be created. The second circumstance represents the situation that the line to be created is an endless line.

In a fourth stage a search run is carried out for picture elements of the same or correlated coding, i.e. for picture elements of the orientated picture element matrix indexed in the third stage by the difference signal evaluation unit 4. For this purpose a picture element evaluation unit 5 investigates the picture elements of the picture element matrix in sequence for indexing by the difference signal evaluation unit 4. The geometrical point coordinates allocated to the indexed picture elements found are determined.

In a fifth stage of the process the point coordinates determined in the fourth stage are taken to an interpolation unit 6, which links the individual point coordinates by lines. The polygon plots formed in this way are depicted on a monitor 7.

In a sixth stage the signal processing operations described in the third and fourth stage are repeated with a picture element in the picture element matrix not defined as the starting point of the iterative procedure in any preceding stage being used as the new starting point.

This last stage is now repeated until all picture elements of the picture element matrix have been evaluated by means of the stages described above. The procedure thus defined— i.e. immediate depiction of a line plot prior to evaluation of the remaining picture elements in the picture element matrix—has the advantage that a relatively simple form of indexation is sufficient to ascertain the line plot itself from the point coordinates belonging to a line plot.

Alternatively it can be provided that all the line plots contained in the picture element matrix are first ascertained, and after this all line plots are simultaneously depicted on the monitor 7. In this case, the index signal Is created by the difference signal evaluation unit 4 must not only contain—as in the first case described—a first index representing the sequence of the point indexed on each occasion in the line plot to be produced. It is rather necessary then that in addition to this first index a second index is created, which contains the relevance of the comparison picture element to a specified line out of the numerous lines to be ascertained.

Obviously it is also possible to carry out the stages described above with respect to the picture elements of a sub-matrix to the orientated picture element matrix or in respect of a specified selection of lines and columns from it—e.g. only for each second column and row.

An extension of the example shown provides for interpolation of picture elements prior to the above described fourth stage. The aim is that at least one indexed picture element—i.e. at least one indexed element of the picture element matrix—depending upon the desired level of resolution is split up into four or nine or sixteen, etc. "sub-picture elements"—i.e. sub-elements—of identical grey value. The advantage of this is that when the search run is carried out in the fourth stage across adjacent picture elements of the same coding one has available a refined grid of indexed picture elements, enabling greater accuracy to be achieved.

Provision can also be made for indexed picture elements to be eliminated prior to the fifth stage, i.e. point coordinates are eliminated which do not contribute to any more precise reproduction of the line structure, because their deviation from the specific lines allocated to them in each case through the interpolation unit 6 is below a prescribed limit.

There can also be provision in the fifth stage for the polygon plots to be processed via the interpolation unit 6 into Spline-curves, Spline-functions being produced which approximate the point coordinates.

This can be followed by a further stage in which the point coordinates and/or Spline-functions are converted into a CAD data format, particularly the data format of Vereinung Deutsche Automobilindustrie Flachen Schnittstelle (VDAFS). VDAFS is an interface used by the Association of German Car Industries (VDA) to transfer surface description data between CAD systems.

An optional further stage is for area elements (patches) to be created automatically from four curves allocated to each other in each case. It is then useful to convert the area elements and the areas specified thereby into a CAD data format, again particularly the VDAFS-format.

A further optional stage is for the area elements created in the last mentioned stage to be joined together.

Figure 2:
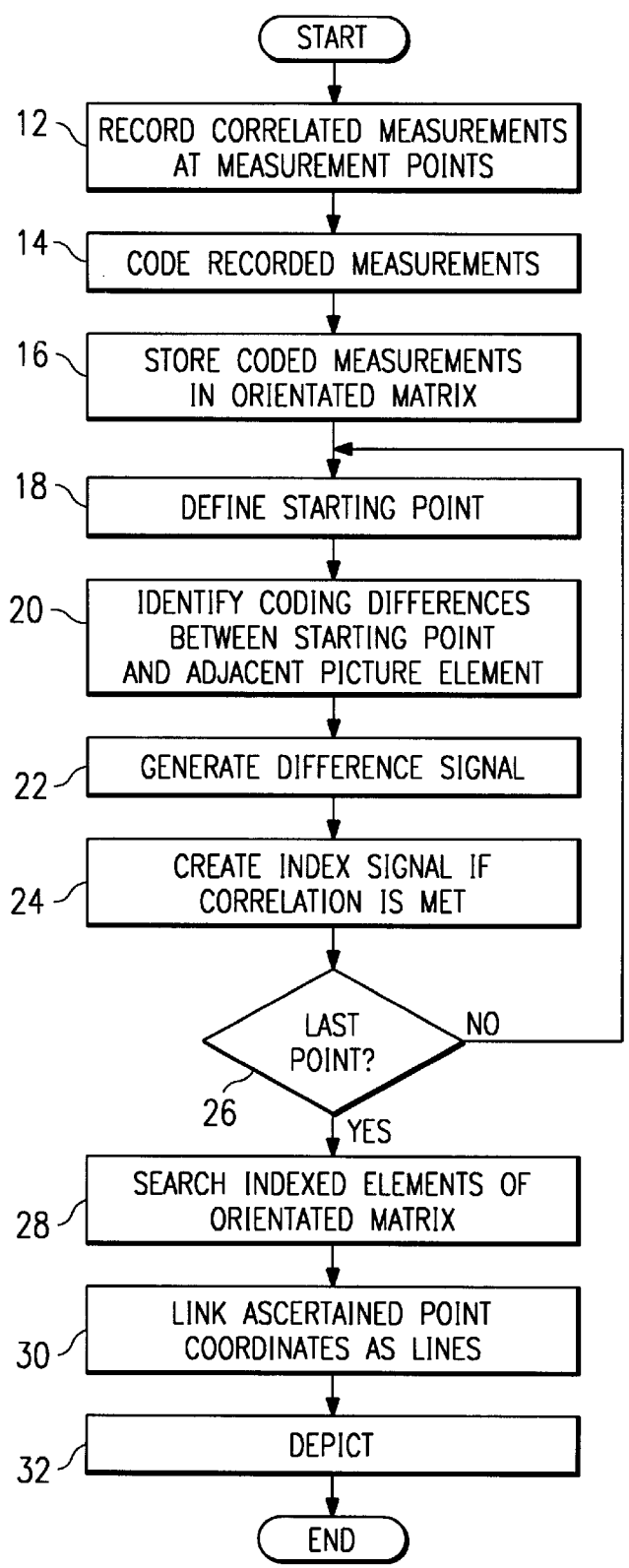
FIG. 2 is a flowchart of an exemplary method to carry out the process of the present invention.

FIG. 2 is a flowchart of an exemplary method 10 to carry out the process of the present invention. The steps of exemplary method 10 may be performed with a device or apparatus such as that shown in FIG. 1 to execute the process. In method 10, in a first stage, at step 12 correlated measurements are recorded at measurement points by means of a measurement recorder with specific characteristics of a measurement object. In a second stage, a measurement coding of the measurements recorded in the first stage is carried out at step 14. These coded measurements are stored in an orientated matrix at step 16, with allocation of a measurement point to an element of the orientated matrix depending upon the geometric point coordinates represented by this measurement point. In a third stage, an element from this orientated matrix is defined as a starting point at step 18. From this starting point, identification of coding differences between the coding allocated to the starting point and the coding of any comparison element of the orientated matrix lying within a defined environment around the starting point is carried out at step 20. A difference signal representing each of the coding differences is deduced or generated at step 22. Analysis is performed to find out whether the difference between these two elements of the orientated matrix corresponds to a predefined correlation, in which case an index signal is created at step 24, by which this comparison element is given an index. The partial step sequence specified by the partial steps of the third stage listed above is repeated. Specifically, at step 26, a determination is made whether the currently defined starting point is the last point. If the currently defined starting point is not the last point, method 10 returns to step 18 where another point is defined as the starting point. Steps 18–26 are repeated until each point has been defined as the starting point at some time. An element of the orientated matrix indexed in the previous partial step sequences is used as the starting point for each fresh partial step sequence. When it is determined that the currently defined starting point is the last point, method 10 moves to step 28. At step 28, in a fourth stage, a search run is carried out over the indexed elements of the orientated matrix and the geometrical point coordinates of the measurement object represented by these elements are ascertained. In a fifth stage, at step 30, the point coordinates thus ascertained are linked as lines and, at step 32, are depicted.

To sum up, it should be stated that the process described and the relevant device or apparatus is of particular advantage in the creation of line data from measurement points. In particular, the procedure is capable of use universally in the design field and in quality assurance and materials testing.

In conclusion it should also be mentioned that the process described cannot only be used for two-dimensional cross section planes through the object measured. Rather it is also possible to create three-dimensional line data. The expert will easily see what modifications are necessary for this from the above description. For the sake of completeness it should be mentioned that the main modification is to provide a three dimensional environment in comparison of the elements of the three dimensional matrix in this case in place of the previously used two-dimensional environment around the starting point.

From the above explanations the expert will also see—and thus no more explicit mention is necessary—, that the process described can also be carried out with software backup—i.e. with a microprocessor or data processing installation, to which the measurements obtained in the first stage by a measurement recorder and coded as described in the second stage can be taken. The function of the units 2,3,4,5 and 6 as described is then carried out using software; thus these functions are also preferably carried out as function routines of a data processing unit.

We claim:

1. A process for the production of line data, comprising the steps of: obtaining correlated measurements of an object at measurement points in a first stage by means of a measurement recorder; measurement coding of the measurements recorded in the first stage being carried out in a second stage at measurement points storing the coded measurements in an orientated matrix, with allocation of a measurement point to an element of the orientated matrix depending upon geometric point coordinates represented by said measurement point, wherein only a partial area of the orientated matrix is involved in the production of line data; from an element of this orientated matrix functioning as a starting point identifying coding differences between the coding allocated to the starting point and the coding of any comparison element of the orientated matrix lying within a defined environment around the starting point in a third stage; generating a difference signal (GD) representing each coding difference being deduced; analyzing this difference signal (GD) to find whether the coding difference of these two elements of the orientated matrix meets a predefined correlation, in which case an index signal (IS) is generated, by which this comparison element is given an index and where the partial step sequence specified by the partial steps in the third stage are constantly repeated, with an element of the orientated matrix indexed in the previous partial step sequences being used as the starting point of a fresh partial step sequence carrying out a search run in a fourth stage through the indexed elements of the orientated matrix and the geometric point coordinates of the object measured represented by these elements are ascertained; and joining in lines and depicting in a fifth stage the point coordinates thus ascertained.

2. The process for the production of line data as defined in claim 1, wherein before the fourth stage is carried out, interpolation of at least one indexed element of the orientated matrix is carried out, with this element being split up into a number of sub-elements of identical coding.

3. The process for the production of line data as defined in claim 1, wherein after the fifth stage at least one index element of the orientated matrix is eliminated, as its deviation from the line allocated to it lies below a prescribed limit.

4. The process for the production of line data as defined in claim 1, further comprising: a further stage following the fifth stage in which the point coordinates represented by the indexed elements of the orientated matrix are approximated by Spline-functions.

5. The process for the production of line data as defined in claim 4, wherein one of the point coordinates and/or Spline-functions are converted into a CAD-data format, particularly the VDAFS-data format.

6. The process for the production of line data as defined in claim 1, wherein an area element is created from lines allocated to each other.

7. The process for the production of line data as defined in claim 6, wherein the area element is converted into a CAD-data format, particularly a VDAFS-data format.

8. The process for the production of line data as defined in claim 6, wherein the area elements created in this way are joined together.

9. The process for the production of line data as defined in claim 1, wherein the index signal (IS) contains a first index, which represents the sequence of the index elements of the orientated matrix in the line to be produced in the fifth stage.

10. The process for the production of line data as defined in claim 1, wherein the third stage is repeated with starting points of different coding until all elements of the orientated matrix have been evaluated, after which all point coordinates ascertained are linked in corresponding lines and simultaneously depicted.

11. The process for the production of line data as defined in claim 10, wherein the index signal (IS) contains in addition to the first index a second index, which represents the relevance of the individual element to a defined line from the numerous lines ascertained.

12. The process for the production of line data as defined in claim 1, wherein one of a nuclear magnetic tomograph, a computer tomography, and a sonograph is used as the measurement recorder for the procedure.

13. The process for the production of line data as defined in claim 1, wherein a predefined element of the orientated matrix is used as the starting point of the iteration process.

14. The process for the production of line data as defined in claim 1, wherein the predefined correlation condition of the third stage is met as regards two elements of the orientated matrix if both elements fundamentally show the same coding.

15. The process for the production of line data as defined in claim 1, wherein the predefined correlation condition of the third stage is met as regards two elements of the orientated matrix if both such comparison elements differ by a defined coding interval.

16. The process for the production of line data as defined in claim 1, wherein the partial step sequence of the third stage is constantly repeated until either no element of the orientated matrix meeting the required correlation condition lies within the defined environment around the starting point of any partial step sequence or until the starting point of the first partial step sequence is reached.

17. The process for the production of line data as defined in claim 1, wherein a grey value coding is used as the measurement coding.

18. The process for the production of line data as defined in claim 1, wherein the defined environment around the starting point of the third stage is a two-dimensional or three-dimensional environment.

19. The process for the production of line data as defined in claim 1, wherein at least the third and fourth stage are carried out using software.

20. Apparatus for the production of line data, comprising: a converter/coding unit, which digitalizes the measurements created by a measurement recorder and carries out measurement coding; a comparator unit which carries out a comparison of two coded measurement points and generates a difference signal (GD); a difference signal evaluation unit, which analyses the difference signal (GD) generated by the comparator unit in accordance with prescribed correlation and if it is present generates an index signal (IS); a further evaluation unit which examines the elements of the orientated matrix for indexation by the difference signal evaluation unit; and an interpolation unit which joins the point coordinates represented by the indexed elements by lines.

21. The apparatus as defined in claim 20, further comprising: a monitor provided to depict the line data created.

22. The apparatus as defined in claim 20, wherein the comparator unit, the difference signal evaluation unit, the additional evaluation unit and the interpolation unit are in the form of functional routines of a data processing unit.

* * * * *